(12) United States Patent
Thomas et al.

(10) Patent No.: US 7,628,406 B1
(45) Date of Patent: Dec. 8, 2009

(54) HAND TRUCK TO TRANSPORT HORSE RELATED EQUIPMENT

(76) Inventors: Charles M. Thomas, 1040 W 350 S, Shelbyville, IN (US) 46176-9606; Lynda D. Thomas, 1040 W 350 S, Shelbyville, IN (US) 46176-9606

( * ) Notice: Subject to any disclaimer, the term of this patent is extended or adjusted under 35 U.S.C. 154(b) by 144 days.

(21) Appl. No.: 11/694,996

(22) Filed: Mar. 31, 2007

(51) Int. Cl.
*B62B 1/04* (2006.01)
*B62B 1/20* (2006.01)

(52) U.S. Cl. .................. 280/47.19; 280/47.18
(58) Field of Classification Search .................. 414/490
See application file for complete search history.

(56) References Cited

U.S. PATENT DOCUMENTS

| | | | | |
|---|---|---|---|---|
| 2,555,178 A * | 5/1951 | Young | ........................ | 280/651 |
| 2,564,248 A * | 8/1951 | Chenette | .................. | 280/47.27 |
| 2,693,001 A * | 11/1954 | Vance | ........................ | 15/323 |
| 3,494,631 A * | 2/1970 | Georgia | .................... | 280/47.19 |
| 3,930,663 A * | 1/1976 | Scripter | ........................ | 280/654 |
| 3,997,182 A * | 12/1976 | Mortenson | ................ | 280/47.27 |
| 4,179,132 A * | 12/1979 | Rich | ........................ | 280/47.26 |
| 4,452,468 A * | 6/1984 | Eads et al. | .................. | 280/641 |
| 4,506,853 A * | 3/1985 | Cathey | .......................... | 248/79 |
| 4,541,535 A * | 9/1985 | Bartholomew | .............. | 211/96 |
| 4,550,930 A * | 11/1985 | Proffit | ........................ | 280/655 |
| D321,773 S * | 11/1991 | Chiang | .......................... | D34/17 |
| 5,123,666 A | 6/1992 | Moore | | |
| 5,338,054 A * | 8/1994 | Imai et al. | .................... | 280/655 |
| 5,354,023 A * | 10/1994 | Meeks | ........................ | 248/129 |
| 5,362,078 A * | 11/1994 | Paton | ...................... | 280/47.18 |
| 5,513,816 A * | 5/1996 | Grubb | ........................ | 242/398 |
| 5,947,492 A * | 9/1999 | Hallberg, Jr. | .............. | 280/47.24 |
| 6,047,866 A * | 4/2000 | Brown | ........................ | 222/608 |
| 6,082,755 A * | 7/2000 | Topar | ...................... | 280/416.1 |
| 6,131,925 A * | 10/2000 | Weldon | ........................ | 280/30 |
| 6,135,466 A | 10/2000 | Irwin | | |
| 6,189,706 B1 * | 2/2001 | Akins | ........................ | 211/87.01 |
| 6,247,710 B1 * | 6/2001 | Luberda | .................. | 280/47.28 |
| 6,601,859 B2 * | 8/2003 | Durham | .................. | 280/47.131 |
| 6,659,476 B2 | 12/2003 | Weida | | |
| 6,758,482 B2 * | 7/2004 | Stallbaumer | .............. | 280/47.27 |
| 6,893,029 B2 * | 5/2005 | Hailston | .................. | 280/47.27 |
| 6,929,269 B2 * | 8/2005 | Oliver | ...................... | 280/47.18 |
| 7,025,363 B1 * | 4/2006 | Leight | ...................... | 280/47.27 |
| 7,255,235 B1 * | 8/2007 | Vry et al. | .................. | 211/85.11 |
| 2004/0182803 A1 * | 9/2004 | Lay et al. | .................. | 211/85.11 |
| 2007/0187544 A1 * | 8/2007 | Proebstle | .................. | 242/472.5 |
| 2007/0296168 A1 * | 12/2007 | Dahl | ........................ | 280/47.35 |

FOREIGN PATENT DOCUMENTS

WO   WO 9500063 A1 *   1/1995

OTHER PUBLICATIONS 600 pound capacity hand truck manufactured as Item# 143711 by Northern Tool+Equipment of Burnsville, Minnesota http://www.northerntool.com/webapp/wcs/stores/servlet/product_6970_47425_47425.

* cited by examiner

*Primary Examiner*—Paul N Dickson
*Assistant Examiner*—Chiedu A Chibogu (57) ABSTRACT

This patent discloses a hand truck to transport horse related equipment. The hand truck may include a framework having a frame, frame support bars, a handle bar, hooks, a tote mount, a saddle rack positioned below the tote mount, an auxiliary mount, and a cooler mount positioned below the saddle rack. The hand truck further may include a plate attached to the framework and wheels attached to the framework.

12 Claims, 10 Drawing Sheets

HAND TRUCK TO TRANSPORT HORSE RELATED EQUIPMENT

BACKGROUND

1. Field

The information disclosed in this patent relates to a hand truck to transport a variety of equipment that may be needed in conjunction with horses, such as show and race horses.

2. Background Information

Horse owners who show or race their horses need various equipment and accessories to support the horses' participation in these events. Horse related equipment may include horse tack (sometimes "tact"). Horse tack a term used to describe any of the various equipment and accessories worn by horses in the course of their use as domesticated animals. Saddles, stirrups, bridles, halters, reins, bits, harnesses, martingales, and breastplates are all forms of horse tack. Many of these items require that they be moved to each location that a show/race horse is moved. However, many of these items are bulky and/or oddly shaped. This makes it difficult to transport them and efficiently store them.

The human participants involved in horse shows or race horsing also need various horse related equipment to support their participation in these events. For example, they may need chairs to sit, food and water for energy, tools for a variety of reasons, and additional clothing to keep warm. It is desirable to move these items to each location that a show/race horse is moved.

The amount of articles typically needed to support a horse is much more than one person can carry at a single time. Most owners of horses either make several trips to transport the material or enlist the support of others to carry the items. At the location where the articles are needed, the articles typically are located closed to each other, but nonetheless scattered about. Thus, there is a need for a device to store and transport a variety of equipment that may be needed in conjunction with horses.

SUMMARY

This patent discloses a hand truck to transport horse related equipment. The hand truck may include a framework having a frame, frame support bars, a handle bar, hooks, a tote mount, a saddle rack positioned below the tote mount, an auxiliary mount, and a cooler mount positioned below the saddle rack. The hand truck further may include a plate attached to the framework and wheels attached to the framework.

DETAILED DESCRIPTION

Figure 1:
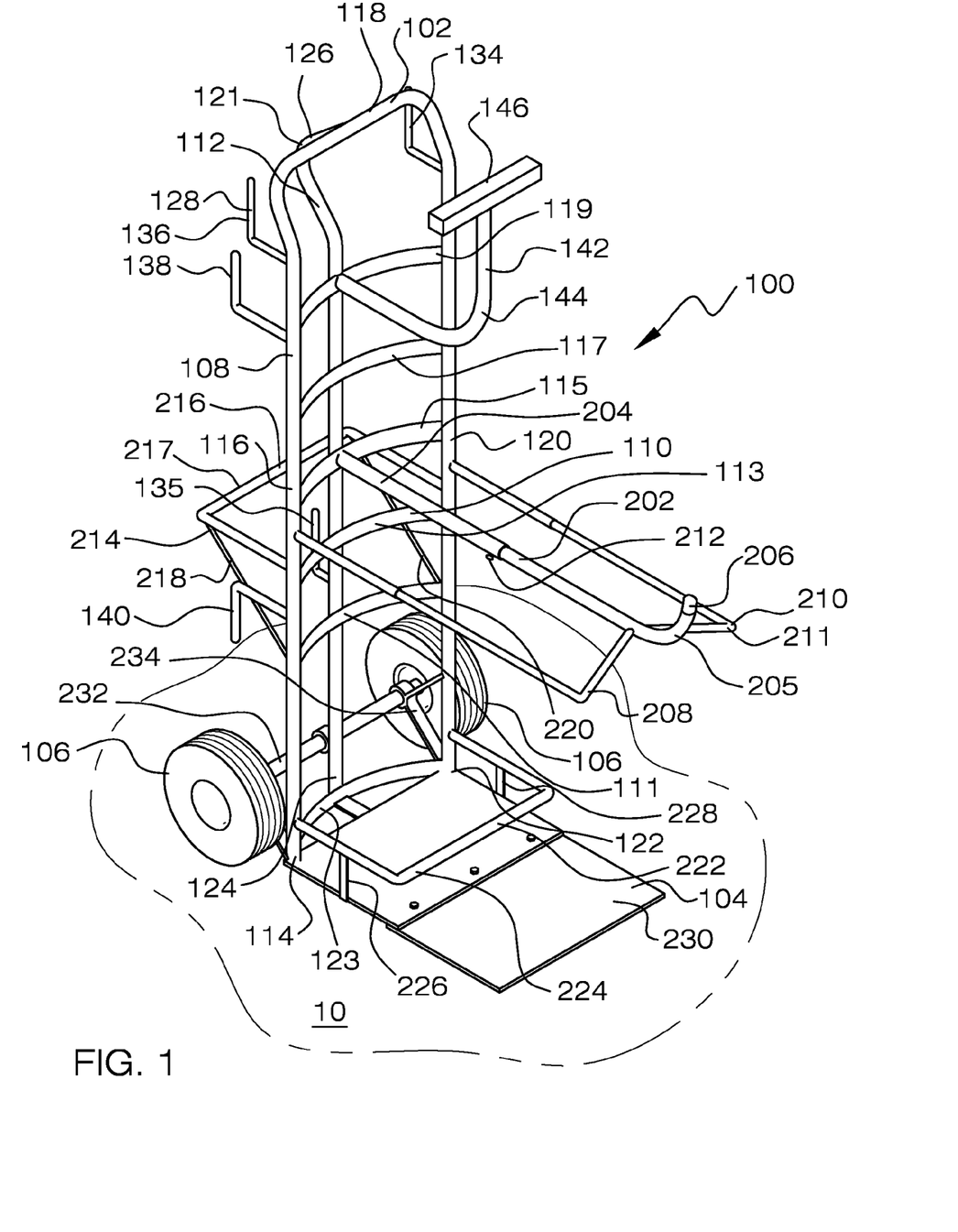
FIG. 1 is a first isometric, angled side view of a hand truck 100.

FIG. 1 is a first isometric, angled side view of a hand truck 100. Hand truck 100 may be a type of L-shaped, hand propelled cart configured to assist in moving articles. With articles loaded on hand truck 100, hand truck 100 may be tilted backward until the weight is balanced over wheels and rolled forward with a push. Hand truck 100 may be classified as a first class lever.

Hand truck 100 may include a framework 102, a plate 104 that may be attached to framework 102, and wheels 106 that may be attached to framework 102. With plate 104 flat against a ground 10 and framework 102 positioned upright, hand truck 100 may be in a first resting position (see FIG. 1). With framework 102 substantially positioned horizontal to ground 10 and plate 104 positioned upright, hand truck 100 may be in a second resting position.

Hand truck 100 may be manufactured in a variety of ways. For example, hand truck 100 may be produced from individual parts. In another example, hand truck 100 may be produced by modifying a 600 pound capacity hand truck manufactured as Item# 143711 by Northern Tool + Equipment of Burnsville, Minn.

Framework 102 may be a structure to support itself and other structural items attached as part framework 102. Framework 102 may include a frame 108, frame support bars 110, and a handle bar 112.

Frame 108 may be a U-shaped structure having a first frame end 114 as part of a right frame bar 116, a top frame bar 118, a left frame bar 120, and a second frame end 122 as part of left frame bar 120. Top frame bar 118 may be connected between right frame bar 116 and left frame bar 120. Each frame end 114, 122 may be connected to plate 104 at substantially a ninety degree angle.

Frame support bars 110 may connect laterally between right frame bar 116 and left frame bar 120. In one example, there may be six frame support bars 110: a first frame support bar 111, a second frame support bar 113, a third frame support bar 115, a fourth frame support bar 117, and a fifth frame support bar 119.

Handle bar 112 may be a vertically arranged bar having a first handle bar end 124 connected to plate 104 and a second handle bar end 126 connected to top frame bar 118. Handle bar 112 may include a handle 121 positioned near top frame bar 118.

Framework 102 additionally may include hooks 128. Hooks 128 may be a curved or angular piece of hard substance to catch, hold, and/or suspend something. Hooks 128 may include ⅜-inch round bar and be configured to support articles, such as bridles, halters, shanks, blinkers, folding chairs, stall guards, garden hose, double snaps, screw eyes, buckets, and the like.

Hooks 128 may include a first hook 130, a second hook 132, and a third hook 134, each connected to left frame bar 120. Third hook 134 may be position at an angle relative to left frame bar 120 that is different than an angle at which first hook 130 and second hook 132 may be positioned relative to left frame bar 120. Hooks 128 further may include a fourth hook 136 attached to handle bar 112 and a fifth hook 136 attached to right frame bar 116, where fifth hook 136 may be position to cooperate with third hook 134, such as being positioned at a similar elevation along frame 108.

Hooks 128 additionally may include a first hose hook 138 and a second hose hook 140, each attached to right frame bar 116. Fifth hook 136 may be positioned at an angle relative to right frame bar 116 that is different than an angle at which first hose hook 138 and a second hose hook 140 may be position relative to right frame bar 116. First hose hook 138 and second hose hook 140 may be pointed in opposite directions. This may aid in first hose hook 138 and second hose hook 140 in receiving and retaining a flexible item, such as a 110-foot garden hose or a rope. First hose hook 138 and second hose hook 140 may include ⅜-inch round bar.

Extending from fifth frame support bar 119 above plate 104 may be a tote mount 142. Tote mount 142 may be configured to support an equine, cattle, hog tote, such as tote #DT6BLACK, manufactured by Miller Manufacturing of Eagan, Minn. (www.miller-mfg.com). The tote may include grooming tools and the like.

Tote mount 142 may include an upwardly curving bar 144 attached to fifth frame support bar 119 at a first end and a tray mount square tube 146. In one example, upwardly curving bar 144 may include a one inch schedule-10 pipe and tote mount square tube 146 may be a 1½" x 1" 11-gage tube. Fifth frame support bar 119 may include 3/16-inch x 1½-inch 11 gauge weld to both outside vertical pipes of hand truck.

Figure 2:
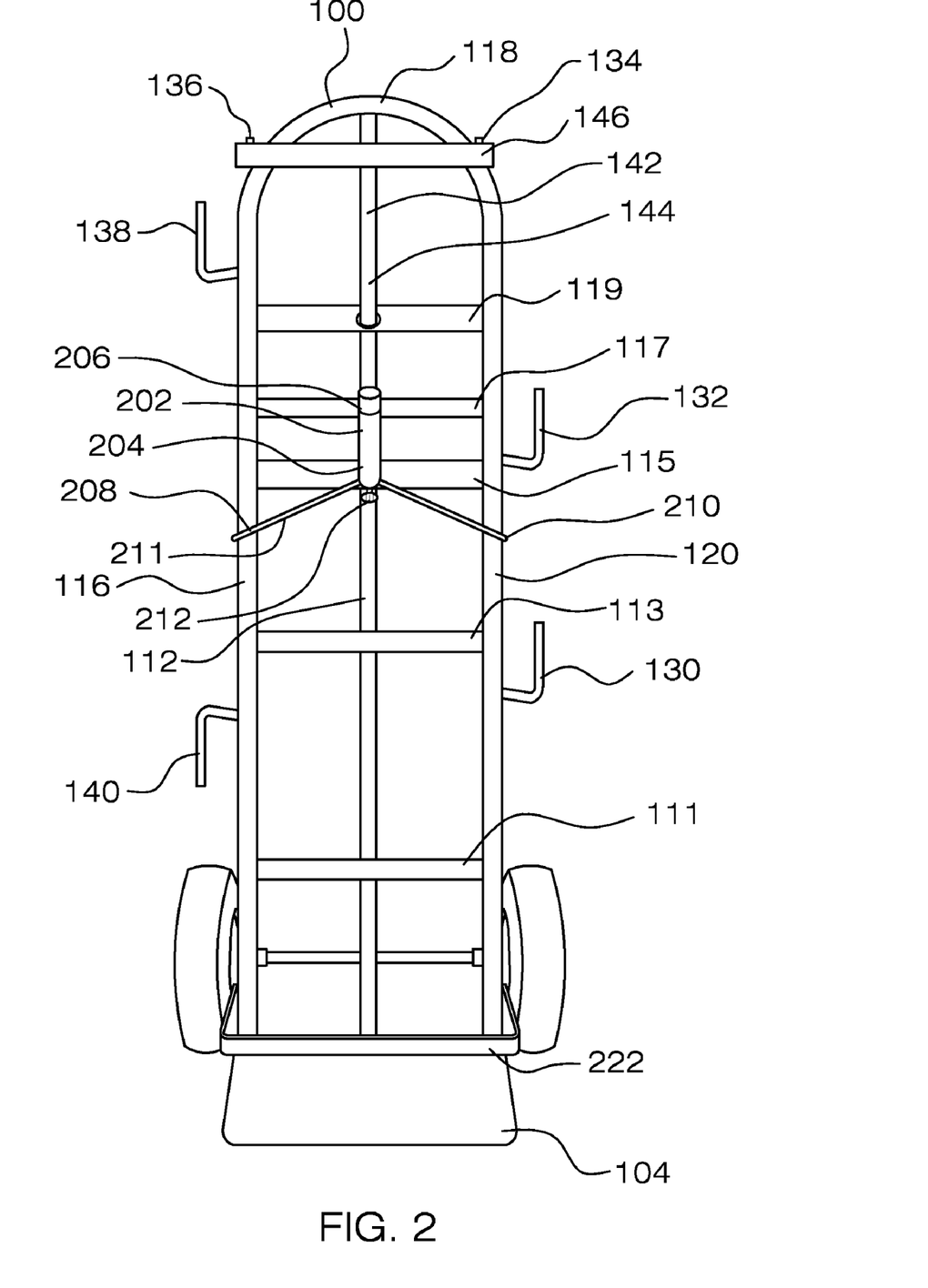
FIG. 2 is a second isometric, angled side view of a hand truck 100.

FIG. 2 is a second isometric, angled side view of a hand truck 100. Framework 102 may include a saddle rack 202. Saddle rack 202 may extend over plate 104. Moreover, saddle rack 202 may be configured to support a horse saddle. Framework 102 may include two or more saddle racks 202.

Saddle rack 202 may include a curved saddle rack bar 204, a saddle rack cap 206, a first saddle rack support bar 208, and a second saddle rack support bar 210. Saddle rack cap 206 may fit on a first end of curved saddle rack bar 204. In one example, saddle rack cap 206 may be a 1-inch rubber cap manufactured as soft touch by Waxman in Cleveland, Ohio.

Curved saddle rack bar 204 may be attached at a second end to third frame support bar 115. First saddle rack support bar 208 may be attached to right frame bar 116 and second saddle rack support bar 210 may be attached to left frame bar 120. Each of curved saddle rack bar 204, first saddle rack support bar 208, and second saddle rack support bar 210 may be configured to telescope within themselves to provide length adjustment to saddle rack 202 to accommodate most any size and weight of saddle, such as Western, English, thoroughbred, showing, or roping saddle. That portion of saddle rack 202 that telescopes may be referred to as a saddle rack extend plate 211. Saddle rack extend plate 211 may not be required for smaller Western saddle or the English or thoroughbred and may be optional. Third frame support bar 115 may include 3/16-inch x 1½-inch 11-gauge welds.

Curved saddle rack bar 204 may include 1-inch pipe schedule-10 as an exterior pipe and ¾-inch schedule-40 as an interior pipe. First saddle rack support bar 208 and second saddle rack support bar 210 each may include ⅜-inch black pipe rod as exterior pipes and ⅜-inch round bar as an interior bar.

Saddle rack 202 may include a wing nut 212 threaded into curved saddle rack bar 204, where wing nut 212 may be configured to secure curved saddle rack bar 204 in place on tightening of wing nut 212. Wing nut 212 may be a ¼-inch x 20-inch x ½-inch long wing nut.

As in FIG. 1, framework 102 may include an auxiliary mount 214. Auxiliary mount 214 may be configured to support towels, blankets, a cooler, or other items. Auxiliary mount 214 may include a platform 216 attached to frame 108 at a position that may overhang wheels 106. Platform 216 may include a remote platform end 217 that may be positioned further away from frame 108 than wheel axle 232. Platform 216 may be supported by a first platform brace 218 attached to right frame bar 116 and a second platform brace 220 attached to left frame bar 120. Platform 216 may include ⅜-inch round bar.

Framework 102 additionally may include a cooler mount 222. Cooler mount 222 may be configured to retain a cooler above plate 104. Cooler mount 222 may include a cooler mount bar 224 having a U-shape configuration. Cooler mount bar 224 may be supported above plate 104 by a first cooler mount brace 226 and a second cooler mount brace 228. Cooler mount bar 224 may include 3/16-inch x ¾-inch flat stock and cooler mount bars 224, 226 may include 3/16-inch x ¾-inch flat stock. In once example, cooler mount bar 224 may be configured to fit around and secure an IGLOO Legend-24 Cooler portable hard ice chest manufactured by IGLOO of Houston, Tex. that may serve as an insulated box used to keep food or drink cool with the assistance of ice cubes or ice packs.

Plate 104 may include a plate extension 230 attached as part of plate 104. Plate extension 230 may include 3/16-inch x 13½-inch x 19¼-inch material. In one example, plate extension 230 may be attached to plate 104 with 4¼-inch x 20½-inch ling screws. Wheels 106 may be connected to each other via a wheel axle 232, which may be retained in place by wheel axle braces 234.

Figure 3:
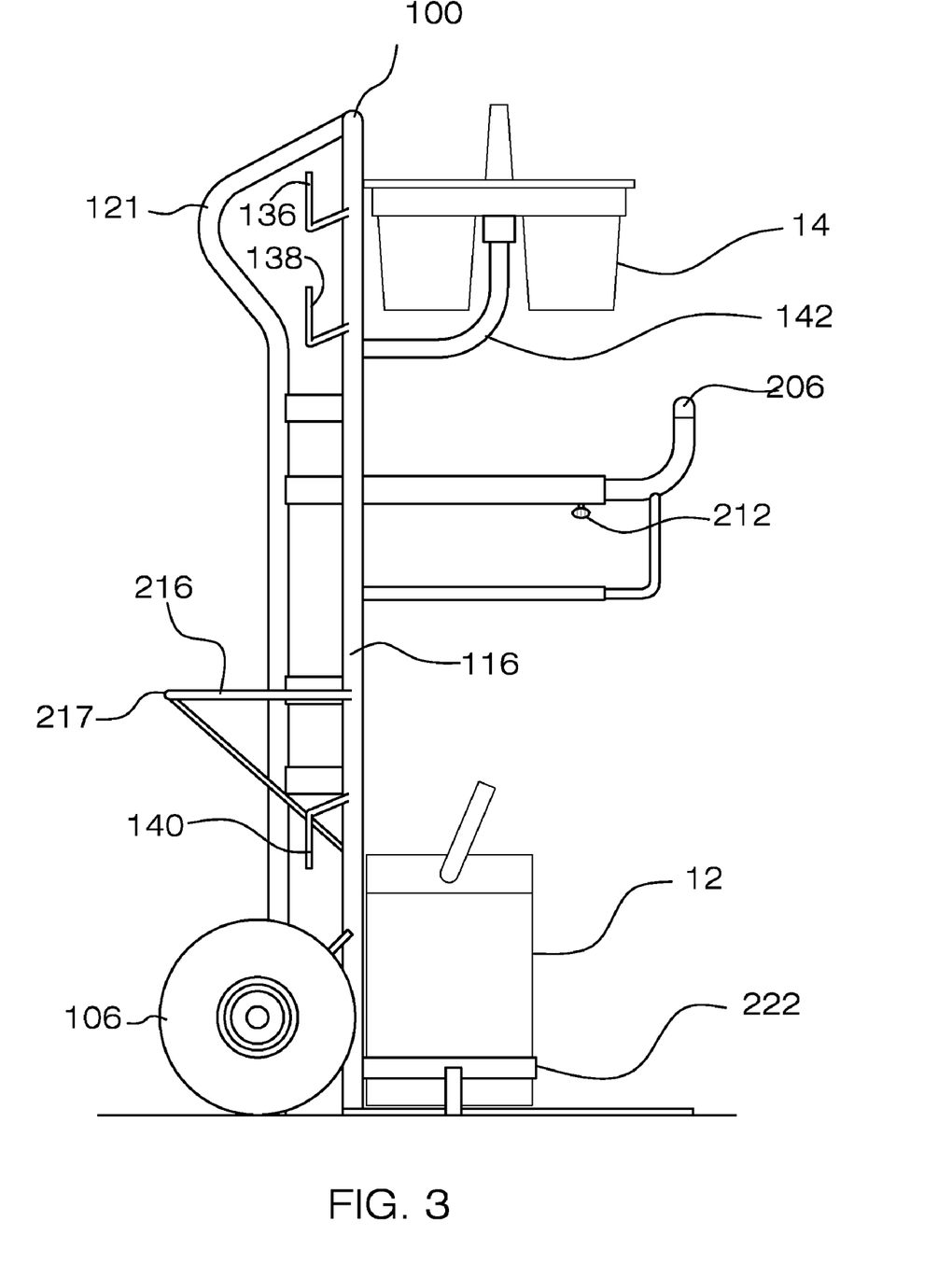
FIG. 3 is a side view of hand truck 100.
Figure 4:
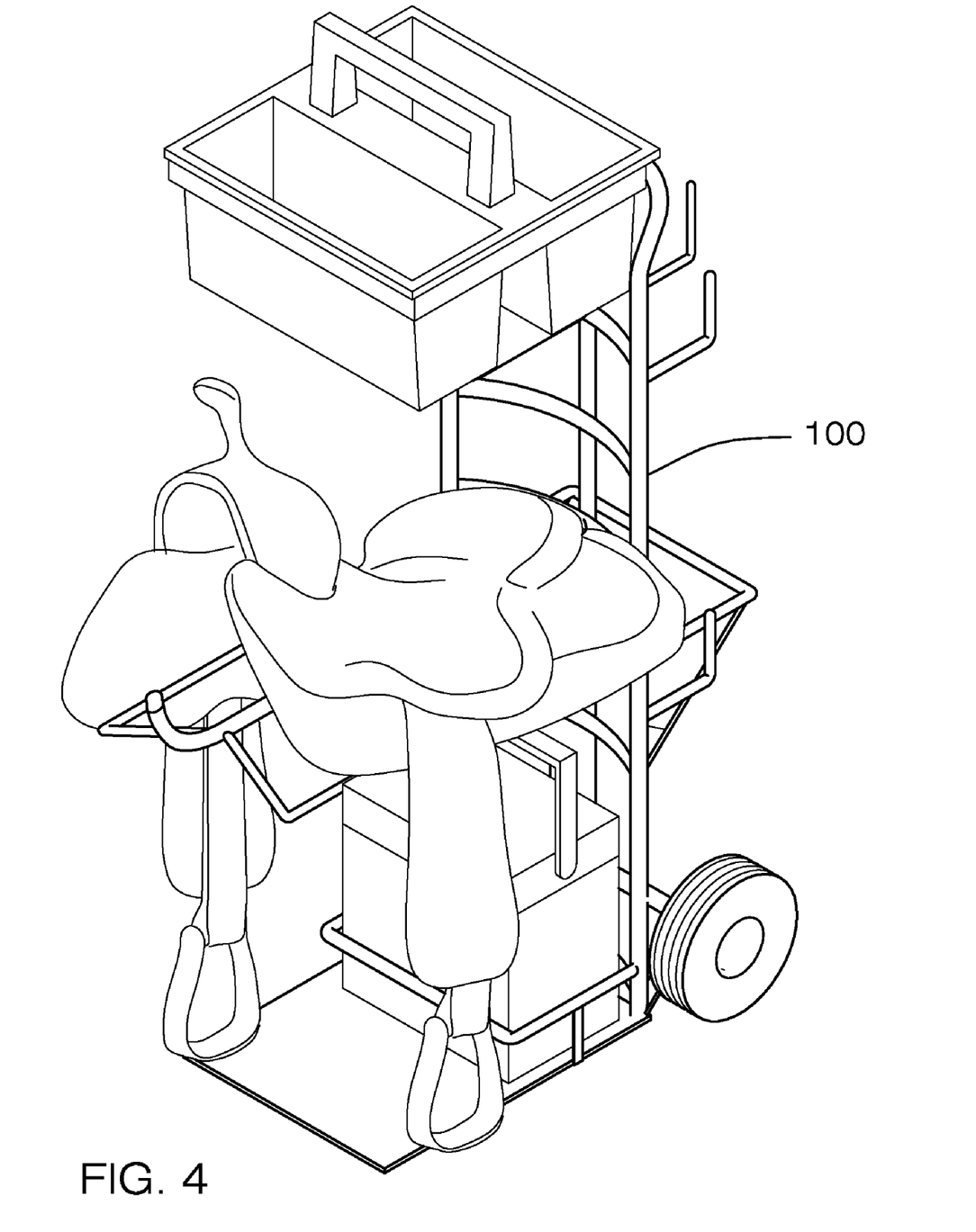
FIG. 4 is an angled front view of hand truck 100 loaded with equipment.
Figure 5:
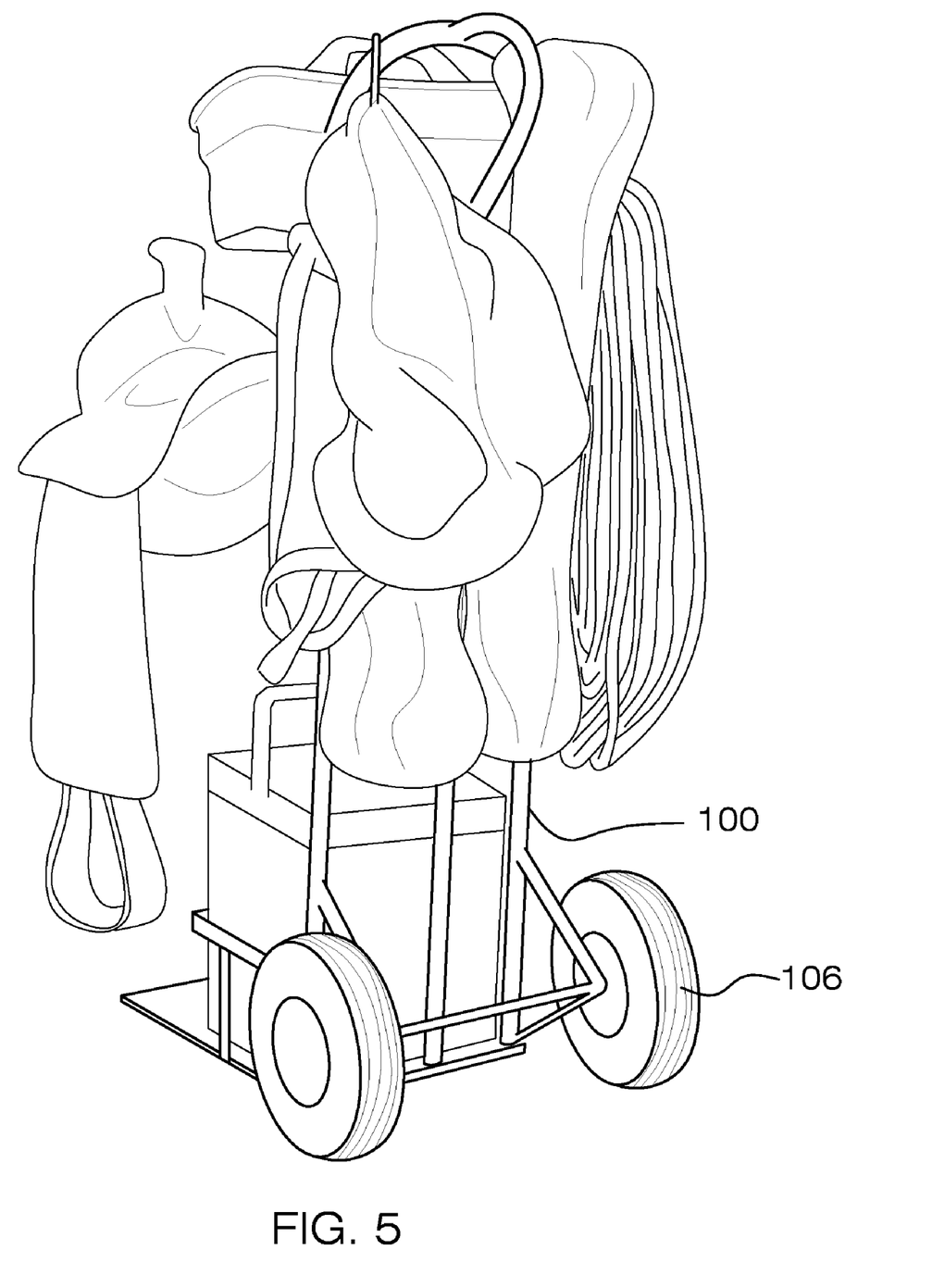
FIG. 5 is an angled rear view of hand truck 100 loaded with equipment.
Figure 6:
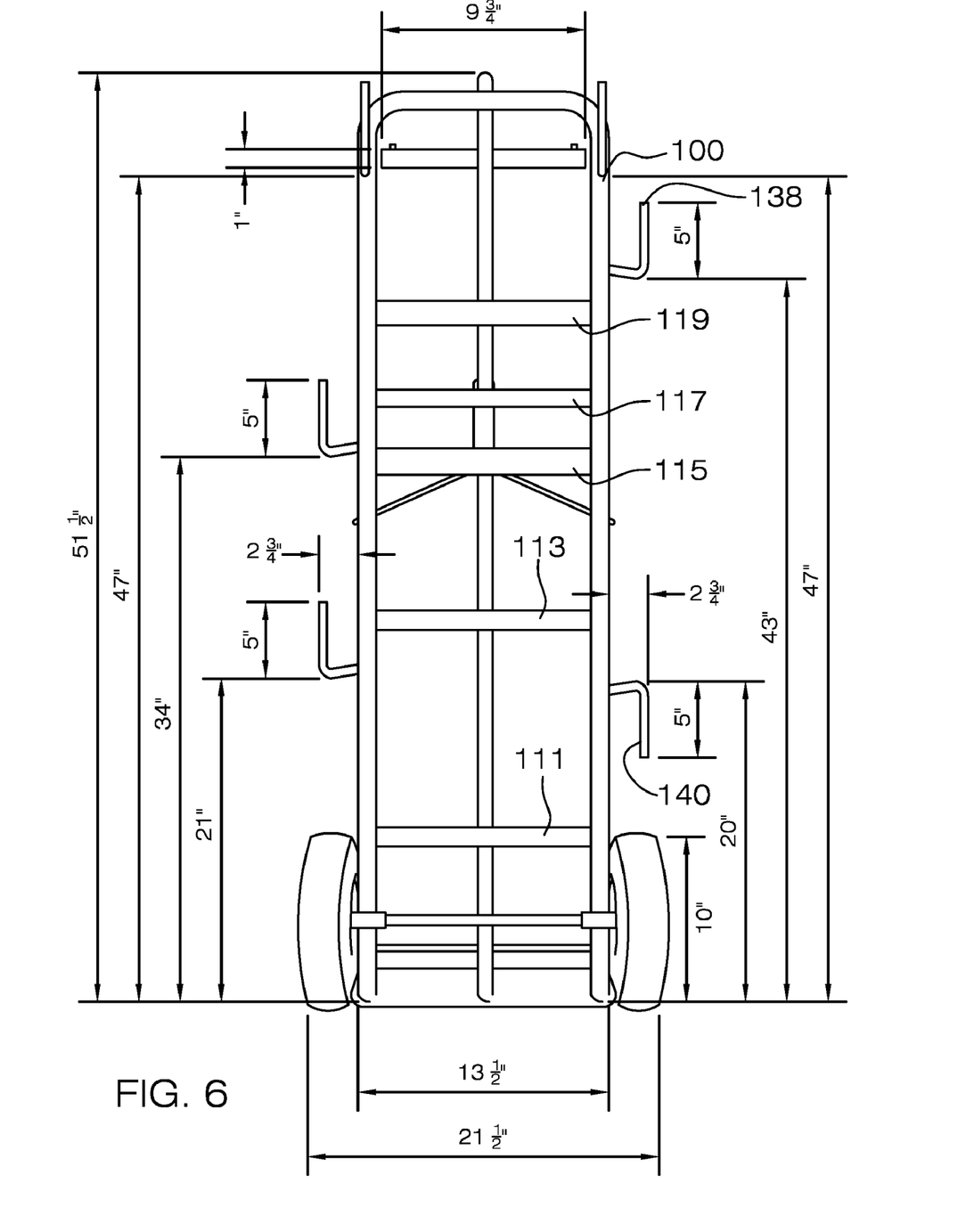
FIGS. 6-10 are various view of hand truck 100 that illustrate dimensional relationships between the various elements of hand truck 100.
Figure 7:
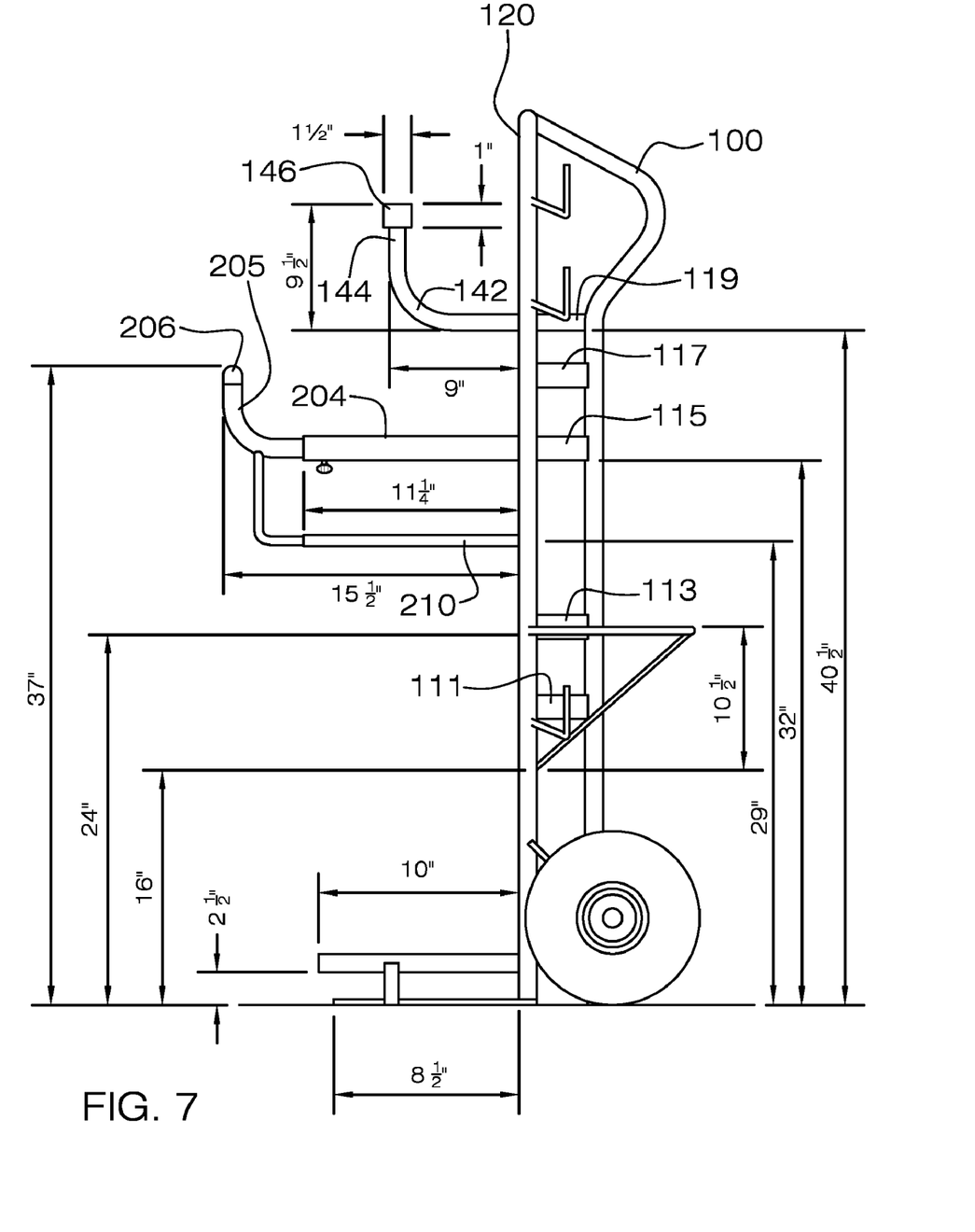
Figure 8:
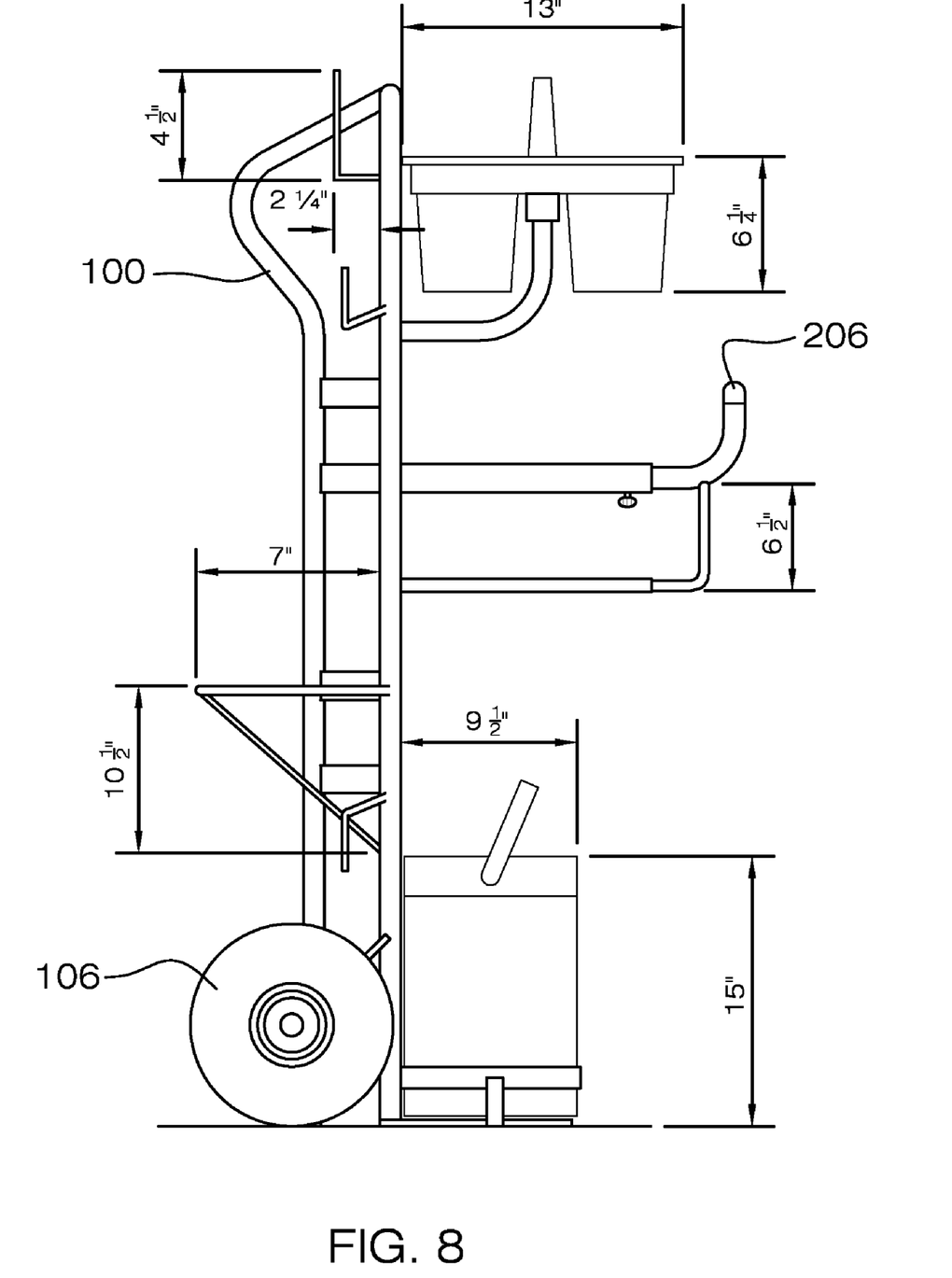
Figure 9:
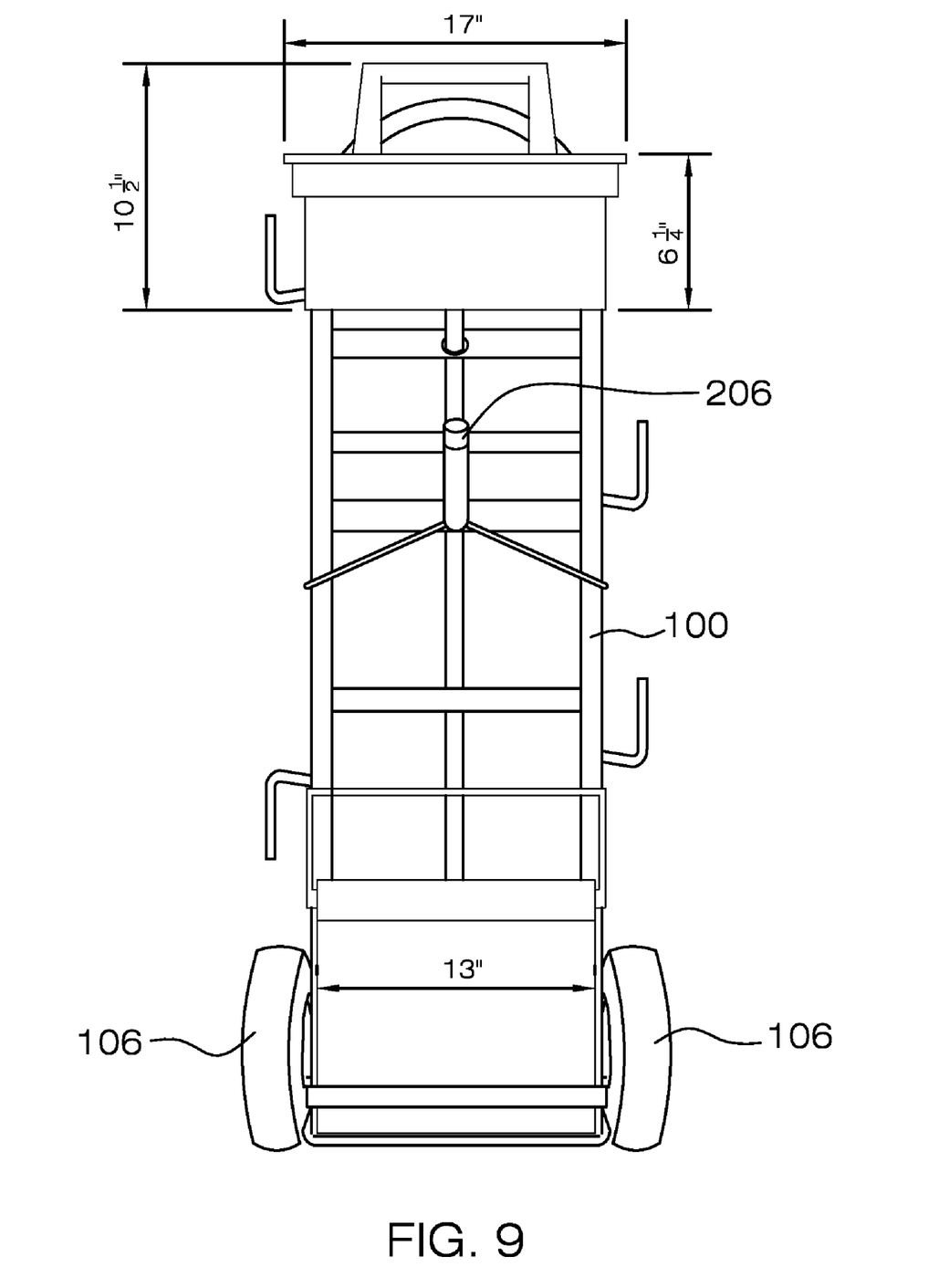
Figure 10:
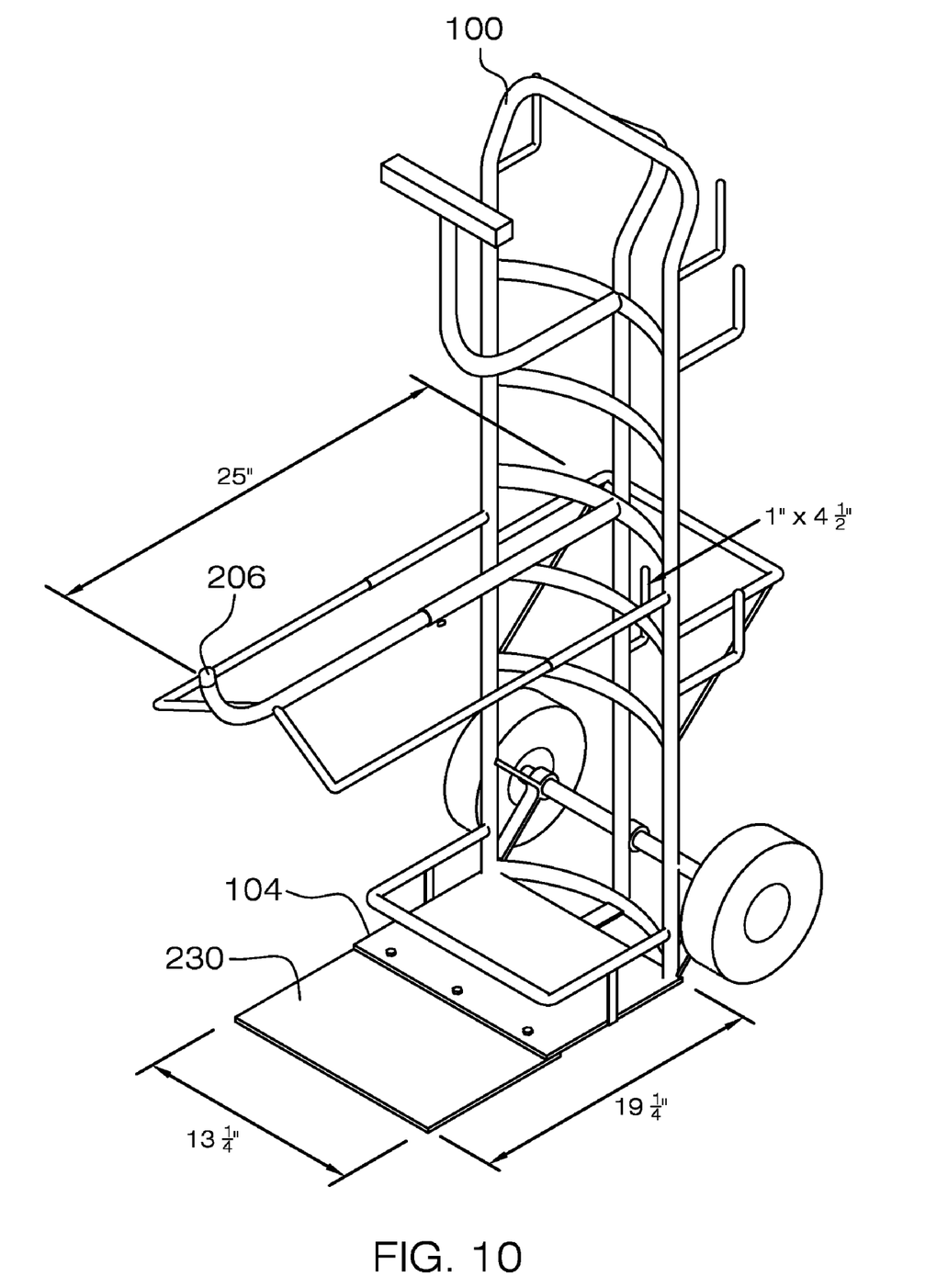

FIG. 3 is a side view of hand truck 100. In this image, a cooler 12 (e.g. IGLOO Legend-24 Cooler portable hard ice chest manufactured by IGLOO of Houston, Tex.) is shown in cooler mount 222. In addition, a tote 14#DT6BLACK, manufactured by Miller Manufacturing of Eagan, Minn. (www.miller-mfg.com) is shown on tote mount 142. FIG. 4 is an angled front view of hand truck 100 loaded with equipment. FIG. 5 is an angled rear view of hand truck 100 loaded with equipment. FIGS. 6-10 are various view of hand truck 100 that illustrate dimensional relationships between the various elements of hand truck 100.

The hand truck may be used for storing and transporting tack. The hand truck may include a steel tubing, pneumatic wheel configuration. The upright may be modified through the incorporation of a pair of steel rod-based, "L"-shaped hooks that may be used for storing bridles and related gear. The opposite side may feature opposing hooks of similar shape that may serve as a means of coiling a hose. The lower load plate may be augmented with an elevated steel strip based the upper end of the unit may be a forward and upwards frame that may serve to hold a cooler.

Located towards curved member that may be topped by a transverse element that may serve to support a dual compartment plastic tray. Located below this may be a forward projecting tube that may be used to telescopically mount a smaller tube with an upturned tip. A bottom-mounted thumb-screw may be used to regulate its degree of extension. Located on the outer end of the fixed portion of this assembly may be a pair of transverse, somewhat downward angled rods. This entire assembly may be used to support a saddle. The rear may be augmented with additional hooks, as well as a horizontally oriented, approximately mid-height, rectangular frame.

The hand truck may fulfill a need for a product that may facilitate the handling of tack. Appealing feature of the hand truck may include its ease of use, durability, convenience, adaptability, and efficiency. This hand truck may provide a technique to store and transport a variety of equipment used in conjunction with show and race horses. Its heavy steel construction may endow it with a good level of durability, while its large pneumatic tires may permit it to be easily maneuvered over rough terrain. Its adjustable saddle mount may accommodate most English, Western, and related saddles. The hand truck may include welded steel.

The information disclosed herein is provided merely to illustrate principles and should not be construed as limiting the scope of the subject matter of the terms of the claims. The written specification and figures are, accordingly, to be regarded in an illustrative rather than a restrictive sense. Moreover, the principles disclosed may be applied to achieve the advantages described herein and to achieve other advantages or to satisfy other objectives, as well.

What is claimed is:

1. A hand truck to transport horse related equipment, the hand truck comprising:
   a plate;
   wheels connected between a wheel axle and having wheel axle braces connected between the wheel axle and the plate;
   a frame having a top frame bar connected between a right frame bar connected to the plate and a left frame bar connected to the plate such that the plate is perpendicular to and in front of the frame and the frame extends upward from the plate, where the wheel axle braces are connected to the right frame bar and the left frame bar such that the wheel axle is positioned behind the frame;
   a handle bar configured substantially as a vertical pole, where the handle bar is connected between the top frame bar and the wheel axle such that the handle bar resides behind the frame;
   frame support bars including first frame support bar, a second frame support bar positioned above the first frame support bar, a third frame support bar positioned above the second frame support bar, a fourth frame support bar positioned above the third frame support bar, and a fifth frame support bar positioned above the fourth frame support bar, where each of the frame support bars are connected between the right frame bar, the handle bar, and the left frame bar to extend behind the frame;
   a saddle rack having a first saddle rack support bar permanently fixed to the right frame bar and a second saddle rack support bar permanently fixed to the left frame bar, where both the first saddle rack support bar and the second saddle rack support bar are L-shaped bars permanently fixed at one end at the same height above the plate between the second frame support bar and the third frame support bar to extend horizontally away from the frame, where the saddle rack further includes a saddle rack main bar permanently fixed to the third frame support bar at a saddle rack main bar first end to reside above both the first saddle rack support bar and the second saddle rack support bar and to extend horizontally away from the frame such that the saddle rack main bar is perpendicular to and resides both behind and in front of the frame, where the saddle rack main bar includes an upwardly curving hook at a saddle rack main bar second end, and where each of the L-shaped first saddle rack support bar and second saddle rack support bar are angled upward and inward to connect to the saddle rack main bar at the saddle rack main bar second end; and
   where the saddle rack is a two piece construction where a distal portion of each of the first saddle rack support bar, the second saddle rack support bar, and the saddle rack main bar form a saddle rack extend plate, where a proximate portion of each of the first saddle rack support bar, the second saddle rack support bar, and the saddle rack main bar are hollow tubes, and where the saddle rack extend plate is configured to move in and out of the hollow tubes such that a maximum length between the saddle rack main bar first end and the upwardly curving hook is not greater than twenty-five inches and a minimum length between the saddle rack main bar first end and the upwardly curving hook is not less than fifteen inches.

2. The hand truck of claim 1, further comprising:
   a tote mount residing directly above the saddle rack, where the tote mount includes an upwardly curving bar permanently fixed to the fifth frame support bar at a first end and a tray mount square tube attached to the upwardly curving bar at a second end.

3. The hand truck of claim 2, where a ratio of a minimum horizontal distance between the upwardly curving hook and the left frame bar and a horizontal distance between the upwardly curving bar and the left frame bar approximately is 15 to 9.

4. The hand truck of claim 2, where a ratio of a height between the upwardly curving bar and the plate and a height between the saddle rack main bar and the plate approximately is 40.5 to 32, where a ratio of a height between the upwardly curving bar and the plate and a height between a cap residing on an end of the upwardly curving hook and the plate approximately is 40.5 to 37.

5. The hand truck of claim 1, further comprising:
   a first hook attached directly to the left frame bar between the first frame support bar and the second frame support bar to extend over the wheels, where the first hook includes a ninety degree upward bend when viewed from the side;
   a second hook attached directly to the left frame bar above the first hook and between the third frame support bar and the fourth frame support bar to extend over the wheels, where the second hook includes a ninety degree upward bend when viewed from the side; and
   a third hook attached directly to the left frame bar above the second hook and between the fifth frame support bar and the top frame bar to extend over the wheels, where the third hook includes a ninety degree upward bend when viewed from the side, and where the third hook is parallel to the saddle rack main bar when viewed from the top and each of the first hook and the second hook are in the same plane when viewed from the top and are at an angle to the saddle rack main bar when viewed from the top such that the first hook and the second hook are not parallel to the saddle rack main bar when viewed from the top.

6. The hand truck of claim 5, further comprising:
   an auxiliary mount having a platform attached to and extending from the frame in a direction opposite that of the platform to overhang the wheels, where the platform includes a remote platform end that is positioned further away from the frame than the wheel axle, where the auxiliary mount further includes a first platform brace extending from the right frame bar to connected to the remote platform end and a second platform brace extending from the left frame bar to connected to the remote platform end, where the first platform brace and the second platform brace are parallel to the saddle rack main bar;
   a fourth hook attached directly to the handle bar between the first frame support bar and the second frame support bar to extend over the wheel axle, where the fourth hook resides under the platform of the auxiliary mount, and where the fourth hook includes a ninety degree upward bend when viewed from the side; and
   a fifth hook attached directly to the right frame bar substantially at a same height above the plate as a height of the third hook above the plate to extend over the wheels, where the first hook includes a ninety degree upward bend when viewed from the side, and where the fifth hook is parallel to the saddle rack main bar when viewed from the top.

7. The hand truck of claim 6, further comprising:
a first hose hook attached directly to the right frame bar below the fifth hook and between the fifth frame support bar and the top frame bar to extend over the wheels, where the first hose hook includes a ninety degree upward bend when viewed from the side, and where the first hose hook is at an angle to the saddle rack main bar when viewed from the top such that the first hose hook is not parallel to the saddle rack main bar when viewed from the top; and
a second hose hook attached directly to the right frame bar between the first frame support bar and second frame support bar to extend over the wheels, where the second hose hook includes a ninety degree upward bend when viewed from the side, and where the second hose hook is parallel to the first hose hook when viewed from the top.

8. The hand truck of claim 1, where a maximum length between the saddle rack main bar first end and the upwardly curving hook is twenty-five inches and where a ratio of a height between the saddle rack main bar and the plate and a height between the second saddle rack support bar and the plate approximately is 32 to 29.

9. The hand truck of claim 1, further comprising:
a wing nut threaded through the saddle rack main bar hollow tube to be in compression against the saddle rack extend plate.

10. The hand truck of claim 1, further comprising:
a cooler mount having a U-shaped cooler mount bar connected to the right frame bar and the left frame bar below the first frame support bar and above the plate to extend away from the frame and be positioned above and off of the plate and below the saddle rack, where the U-shaped cooler mount bar has a width equal to a width of the frame, where the cooler mount includes a first cooler mount brace connected between the U-shaped cooler mount bar and a right edge of the plate and a second cooler mount brace connected between the U-shaped cooler mount bar and a left edge of the plate, and where a bottom of the U-shaped cooler mount bar resides at least two inches above the plate, where the cooler mount bar is configured to fit around and secure a cooler.

11. The hand truck of claim 10, where the cooler mount bar is configured to fit around and secure an IGLOO Legend-24 Cooler portable hard ice chest manufactured by IGLOO of Houston, Tex.

12. The hand truck of claim 11, where the plate includes a plate extension fixed to the plate as part of the plate and where a length of the cooler mount approximately is ten inches, a width of the cooler mount approximately is thirteen inches, and a height of the cooler mount from the plate approximately is 2.5 inches.

\* \* \* \* \*